US010970499B2

(12) United States Patent
Sequeira et al.

(10) Patent No.: US 10,970,499 B2
(45) Date of Patent: Apr. 6, 2021

(54) DYNAMICALLY CHANGING A TAG'S DISPLAYED CONTENT BASED ON THE TYPE OF CUSTOMER INTERACTION WITH AN ITEM

(71) Applicant: Sensormatic Electronics, LLC, Boca Raton, FL (US)

(72) Inventors: Melwyn F. Sequeira, Plantation, FL (US); Hubert A. Patterson, Boca Raton, FL (US); Mohammad Mohiuddin, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 261 days.

(21) Appl. No.: 15/806,062

(22) Filed: Nov. 7, 2017

(65) Prior Publication Data
US 2018/0276692 A1 Sep. 27, 2018

Related U.S. Application Data

(60) Provisional application No. 62/476,532, filed on Mar. 24, 2017.

(51) Int. Cl.
*G06K 7/10* (2006.01)
*G06Q 30/02* (2012.01)
(Continued)

(52) U.S. Cl.
CPC ....... *G06K 7/10366* (2013.01); *G06Q 10/087* (2013.01); *G06Q 30/0201* (2013.01);
(Continued)

(58) Field of Classification Search
CPC .......... G06K 7/10366; G06Q 30/0201; G06Q 30/0202
(Continued)

(56) References Cited

U.S. PATENT DOCUMENTS

| 6,924,781 | B1 * | 8/2005 | Gelbman | .............. G06F 3/1454 340/10.6 |
| 10,244,064 | B2 * | 3/2019 | Werner | ............... G06F 16/2291 |

(Continued)

OTHER PUBLICATIONS

Melià-Seguí, Pous, Carreras, Morenza-Cinos, Parada, Liaghat, and De Porrata-Doria, Enhancing the Shopping Experience through RFID in an actual retail store, Sep. 2013, UbiComp '13 Adjnut: Proceedings of the 2013 ACM conference on Pervasive and ubiquitous computing adjunct publication, p. 1029-1036. (Year: 2013).*

*Primary Examiner* — Jason B Dunham
*Assistant Examiner* — Brittany E Bargeon
(74) *Attorney, Agent, or Firm* — Arent Fox LLP

(57) ABSTRACT

Systems and methods for dynamically changing displayed content of a tag. The methods comprise: performing operations by sensors of the tag to detect when an individual is interacting with a first item to which the tag is coupled; determining a type of interaction between the individual and the first item; selecting at least one first accessory from a plurality of accessories for the first item based on the type of interaction; obtaining information for the selected at least one first accessory that is to be presented to the individual; and dynamically changing the displayed content of the tag to include the obtained information while the individual is still in proximity to the tag or interacting with the first item.

26 Claims, 7 Drawing Sheets

(51) Int. Cl.
  *G06T 11/60* (2006.01)
  *G08B 13/24* (2006.01)
  *G06Q 10/08* (2012.01)
  *G06F 3/0484* (2013.01)
  *G06Q 20/20* (2012.01)
(52) U.S. Cl.
  CPC .......... *G06Q 30/0202* (2013.01); *G06T 11/60* (2013.01); *G08B 13/248* (2013.01); *G08B 13/2417* (2013.01); *G08B 13/2462* (2013.01); *G06F 3/04842* (2013.01); *G06Q 20/206* (2013.01); *G06Q 30/0205* (2013.01)
(58) Field of Classification Search
  USPC .......................................................... 705/7.31
  See application file for complete search history.

(56) References Cited

U.S. PATENT DOCUMENTS

| | | | | |
|---|---|---|---|---|
| 2002/0109593 | A1* | 8/2002 | Swartzel | G06Q 10/087 340/540 |
| 2004/0144842 | A1 | 7/2004 | Brignone et al. | |
| 2005/0149414 | A1* | 7/2005 | Schrodt, IV | G06Q 10/087 705/29 |
| 2007/0136152 | A1* | 6/2007 | Dunsker | G06Q 10/08 705/28 |
| 2009/0183403 | A1 | 7/2009 | Wright | |
| 2011/0099061 | A1* | 4/2011 | Giffin | G06Q 30/02 705/14.49 |
| 2011/0276382 | A1* | 11/2011 | Ramchandani | G06Q 30/0261 705/14.25 |
| 2011/0289023 | A1* | 11/2011 | Forster | G06K 19/07703 705/500 |
| 2013/0173435 | A1* | 7/2013 | Cozad, Jr. | G06Q 10/087 705/28 |
| 2013/0275261 | A1* | 10/2013 | Yoked | G06Q 10/087 705/26.8 |
| 2014/0162522 | A1* | 6/2014 | Zhou | H05B 33/10 445/24 |
| 2014/0210624 | A1* | 7/2014 | Wandel | E05B 73/0017 340/572.1 |
| 2015/0046237 | A1* | 2/2015 | Slonimsky | G06Q 30/0267 705/14.16 |
| 2015/0262236 | A1* | 9/2015 | Cypher | G06Q 30/0261 705/14.58 |
| 2015/0348384 | A1* | 12/2015 | Tam | G06K 7/10128 340/572.1 |
| 2016/0042315 | A1* | 2/2016 | Field-Darragh | G06Q 30/0282 705/28 |
| 2016/0086191 | A1* | 3/2016 | Fonzi | G06Q 30/0269 705/304 |
| 2016/0134930 | A1* | 5/2016 | Swafford | A47F 5/0068 725/80 |
| 2016/0180404 | A1* | 6/2016 | Stern | G06Q 30/0269 705/14.58 |
| 2016/0180672 | A1 | 6/2016 | Hoehn et al. | |
| 2017/0061525 | A1* | 3/2017 | McCoy | G06Q 30/0639 |
| 2017/0178104 | A1* | 6/2017 | Fernandez | H04W 4/023 |
| 2018/0068375 | A1* | 3/2018 | Dey | G06Q 30/0633 |

* cited by examiner

DYNAMICALLY CHANGING A TAG'S DISPLAYED CONTENT BASED ON THE TYPE OF CUSTOMER INTERACTION WITH AN ITEM

CROSS-REFERENCE TO RELATED APPLICATIONS

The present application claims priority to U.S. Patent Application Ser. No. 62/476,532 filed on Mar. 24, 2017, the entirety of which is incorporated herein by reference.

FIELD

This document relates generally to intelligence and security systems (e.g., for retail applications). More particularly, this document relates to implementing systems and methods for dynamically changing a tag's displayed content based on the type of customer interaction with an item.

BACKGROUND

Retailers would like to leverage predictive analytics to detect customer interaction with certain types of merchandise, and thus "extract" customer preferences thereby "customizing" store merchandize to suit customer preferences/demographics. In order to accomplish this, retailers are constantly relying on data obtained from multi-functional sensors to identify and categorize customer preferences.

SUMMARY

The present disclosure concerns implementing systems and methods for dynamically changing displayed content of a tag. The methods comprise: performing operations by sensors of the tag to detect when an individual is interacting with a first item to which the tag is coupled; determining a type of interaction between the individual and the first item; selecting at least one first accessory from a plurality of accessories for the first item based on the type of interaction; obtaining information for the selected at least one first accessory that is to be presented to the individual; and dynamically changing the displayed content of the tag to include the obtained information while the individual is still in proximity to the tag or interacting with the first item.

In some scenarios, the first accessory is selected based further on the first item's location and the at least one first accessories location. In those or other scenarios, the display of a push notification message on the individual's mobile device is triggered when the interaction is of a given type.

In those or other scenarios, a current inventory for the first item is determined in response to a detection that the individual is interacting with the first item. The displayed content of the tag is dynamically changed to include: the current inventory; and/or instructions how to order the item when the current inventory is zero.

In those or yet other scenarios, information about the individual's interest and interaction with the first item is logged or stored as part of historical information. Historical data is analyzed to determine a degree of interest or a degree of interaction for each second item of a plurality of second items of the same or similar type as the first item by a plurality of individuals. A person can be dispatched to (a) re-position at least one of the first item and the second item with a given degree of interest or interaction, and/or (b) attend to an individual's needs relating to the second item with a highest degree of interest or interaction.

DESCRIPTION OF THE DRAWINGS

The present solution will be described with reference to the following drawing figures, in which like numerals represent like items throughout the figures.

DETAILED DESCRIPTION

Figure 1:
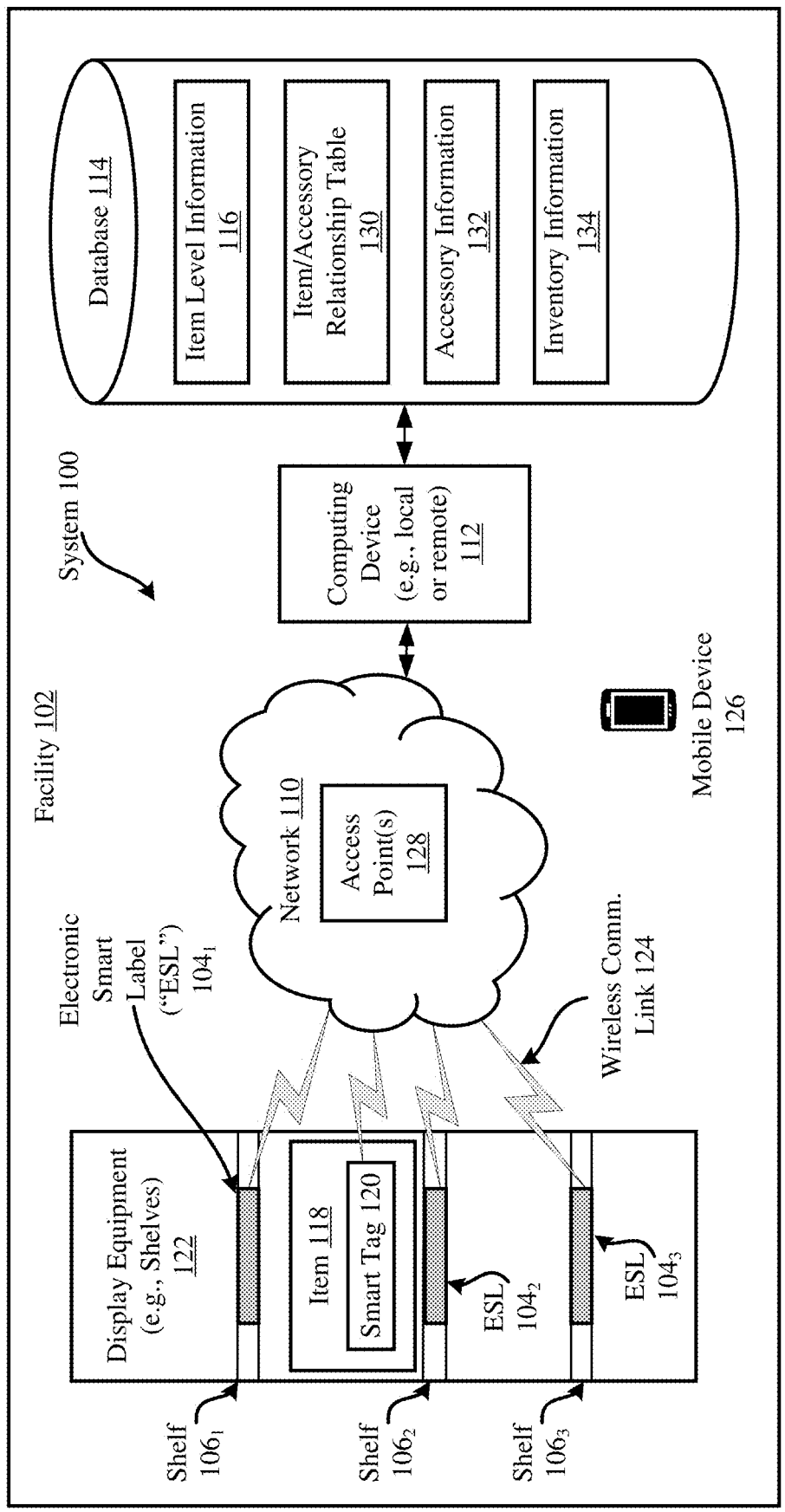
FIG. 1 is an illustration of an illustrative system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns implementing systems and methods for dynamically changing a tag's displayed content. The methods generally involve: sensing when a person is in proximity to a tag coupled to an item with a static location (e.g., an oven, refrigerator, car, etc.); determining the type of customer interaction with the item; identifying at least one accessory for the item based on the type of customer interaction; providing information for the identified accessory to the tag; and changing the display content of the tag to include the received information associated with the identified accessories (e.g., accessory product information (product description and/or price), promotional information, and/or sale information). This process is repeated each time a new type of customer interaction is detected. Thus, the tag's displayed content can be dynamically changed multiple times when a customer is interacting with the item on the floor of a retail store (e.g., when the customer is looking inside a home appliance (e.g., an oven with pots/pans as accessories), when the customer is interacting with the electronic menus of the home appliance (e.g., an oven with a smart home control system as an accessory), etc.). The term "accessory", as used herein, includes (but is not limited to): a useful auxiliary item that can be attached to or removed from an item (e.g., a drill bit or battery of a drill); and/or a product that can be used in conjunction with another product (e.g., an oven cleaner for cleaning an oven, or a water pipe fitting for a washer/dryer).

In some scenarios, the methods also involve: determining a current inventory for the item; and dynamically changing the displayed content of the tag to include information specifying the item's current inventory. If the current inventory is zero or one (e.g., the item on display), then the tag can also output information indicating that the item can be ordered via a cashier.

In those or other scenarios, the methods further involve: tracking the number and types of customer interactions with each item of a plurality of items; dispatching personnel to re-position the item in a facility based the tracked number and types of customer interaction therewith (e.g., so as to increase sales of the item or another item); using the tracked number and types of customer interactions to determine how many employees are needed to attend to customer needs relating to the item; and/or dispatching one or more employees to the item's location based in results of the determination.

Referring now to FIG. 1, there is provided an illustration of an illustrative system 100. System 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 has a smart tag 120 coupled thereto. This coupling is achieved via an adhesive (e.g., glue), a mechanical coupler (e.g., straps, clamps, snaps, etc.), a weld, chemical bond or other means. The smart tag 120 is generally configured to provide a visual and/or auditory output of item level information, accessory information, and/or inventory information. The item level information includes, but is not limited to, an item description, item nutritional information, a promotional message, an item regular price, an item sale price, a currency symbol, and/or a source of the item. The accessory information includes, but is not limited to, an accessory description, accessory nutritional information, a promotional message, an accessory regular price, an accessory sale price, a currency symbol, a source of the accessory, and/or an accessory location in the facility. The inventory information includes, but is not limited to, the number of a given item in stock at a particular facility.

The smart tag 120 will be described in detail below in relation to FIGS. 2-4. The item level information, accessory information and/or inventory information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The item 118 is disposed on display equipment 122. The display equipment includes, but is not limited to, shelves $106_1$-$106_3$, display cabinets, and/or exhibit cases. In the shelf scenario, each shelf $106_1$-$106_3$ may have an Electronic Smart Label ("ESL") affixed thereto. ESLs are well known in the art, and therefore will not be described herein. Still, it should be understood that the ESLs display information relating to the items stored on the respective shelves. In some scenarios, the ESLs are connected to a corporate network via long-range radio technology. In this case, the ESLs may communicate with the smart tags via a short-range or long-range radio and provide informational updates thereto.

The smart tag 120 and ESLs $104_1$-$104_3$ comprise wireless communication components that enable the communication of item level information 116, accessory information 132 and/or inventory information 134 thereto and/or therefrom. The wireless communication components can implement one or more different types of communication technology. The communication technologies can include, but are not limited to, Radio Frequency ("RF") communication technology; Bluetooth technology; WiFi technology; Sub GHz technology; beacon technology; LiFi technology; and/or Ultra Wide Band ("UWB") technology. Each of the listed types of communication technology are well known in the art, and therefore will not be described herein.

The item level information 116, accessory information 132, and/or inventory information 134 is provided to the smart tag and ESLs from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114, smart tag 120 and/or ESLs $104_1$-$104_3$; and/or perform language and currency conversion operations using item level information, accessory information and/or inventory information obtained from the database 114, smart tag 120 and/or ESLs $104_1$-$104_3$. The data can include, but is not limited to, item level information 116, accessory information 132, and/or inventory information 136.

Accordingly, the computing device 112 facilitates updates to the item level information, accessory information, and/or inventory information output from the smart tags and/or ESLs. Such information updating can be performed periodically: in response to instructions received from an associate (e.g., a retail store employee); in response to a detected change in the item level, accessory and/or inventory information; in response to a detection that an individual is in proximity to and/or interacting with the smart tag or ESL; and/or in response to any motion or movement of the smart tag. For example, if a certain product is placed on sale, then the sale price for that product is transmitted to access point 128, which in turn transmits the sale price to each smart tag/ESL associated with that product. The sale price is then output from the smart tags/ESLs. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116, accessory information 132 and/or inventory information 136 from the computing device 112, optionally translates this information, and sends it to the smart tag 120 and/or ESLs 104$_1$-104$_3$ via wireless communication links 124.

Although a single computing device 112 is shown in FIG. 1, the present solution is not limited in this regard. It is contemplated that more than one computing device can be implemented. Also, the present solution is not limited to the illustrative system architecture described in relation to FIG. 1. For example in other scenarios, the present solution is used in a system such as that disclosed in U.S. Patent Publication No. 2012/0326849 to Relihan et al. (incorporated herein by reference).

During operations of system 100, the content displayed on the display screens of the smart tags 120 and ESLs 104$_1$, . . . , 104$_3$ are dynamically controlled based on tag related information, item related information, accessory related information, and/or customer interaction information. The tag related information includes, but is not limited to, first information indicating that an individual is in proximity the smart tag and/or ESL, and/or second information indicating a location of the smart tag 120. The item related information includes, but is not limited to, third information identifying the item to which the tag is coupled. The accessory related information includes, but is not limited to, fourth information identifying any accessories for the item 118. The customer interaction information includes, but is not limited to, fifth information indicating that the individual is interacting with the item 118 or tag 120, and/or information specifying the type of interaction between the individual and item 118 or tag 120. The manner in which the displayed content is dynamically changed will become more evident as the discussion progresses.

The first, second and/or fifth information can be derived based on sensor data generated by sensors local to or internal to the smart tag 120. Accordingly, the smart tag 120 comprises one or more sensors to detect its location, detect any individuals in proximity thereto, detect any interactions between individuals and the item 118, and collecting information useful for determining the type of said interactions. The sensors include, but are not limited to, an Inertial Measurement Unit ("IMU"), a vibration sensor, an accelerometer, a gyroscope, a proximity sensor, a microphone, a communications device, a camera, at least one switch (e.g., to detect whether an oven door is opened or closed), and/or a heat sensor (e.g., a UWB radio). The communication device of the tag can be used to communicate with other sensors disposed or coupled to the item at various locations. For example, the tag's communications device can receive data from other external sensors that is useful for determining if an individual is interacting with the item and/or the type of interaction. These external sensors include cameras disposed on a near-by structure (e.g., wall or ceiling). The present solution is not limited to the particulars of this example.

In some scenarios, a sensor embedded in the smart tag 120 detects when an individual is in proximity to and/or is interacting with the item 118 to which the smart tag is coupled. When such a detection is made, the smart tag 120 retrieves accessory information 132 from a local memory or a remote datastore 114. For example, the item comprises a kitchen appliance such as an oven or refrigerator. In this oven case, the accessories include pots, pans, stove burner covers, replacement drip pans, home automation systems, and various other products or attachments that could be used with the oven. Accordingly, the accessory information includes identifiers, descriptions, pricing and/or locations of the listed accessories. The smart tag's display is then dynamically changed to include all or some of the accessory information (e.g., the display indicates that the oven is a smart oven that can be part of a home automation system and has various replacement parts). The present solution is not limited to the particulars of this example.

In some scenarios, information is pushed to the individual via his(her) mobile device 126 (in addition to or as an alternative to the tag). The information is selected based on the individual's interaction with the item. The information can include, but is not limited to, item level information, accessory information, inventory information, promotional information, and/or account information.

In those or other scenarios, the system 100 tracks the number and types of customer interactions with each item of a plurality of items. The tracked number and types of customer interactions are used to determine how many employees are needed to attend to customer needs relating to the item. One or more employees are then dispatched to the item's location based in results of the determination. Additionally or alternatively, an employee is dispatched to re-position the item in the facility 102 based the tracked number and types of customer interactions therewith (e.g., so as to increase sales of the item or another item).

Figure 2:
FIG. 2 is an illustration of an exemplary Electronic Smart Tag ("EST").

Referring now to FIG. 2, there is an illustration of an exemplary EST 200 displaying item level information. An exemplary architecture for the EST 200 is provided in FIGS. 3-4. Smart tag 120 and/or ESLs 104$_1$-104$_3$ of FIG. 1 is/are the same as or substantially similar to EST 200. As such, the discussion of EST 200 is sufficient for understanding the smart tag 120 and/or ESLs 104$_1$-104$_3$ of FIG. 1.

Figure 3:
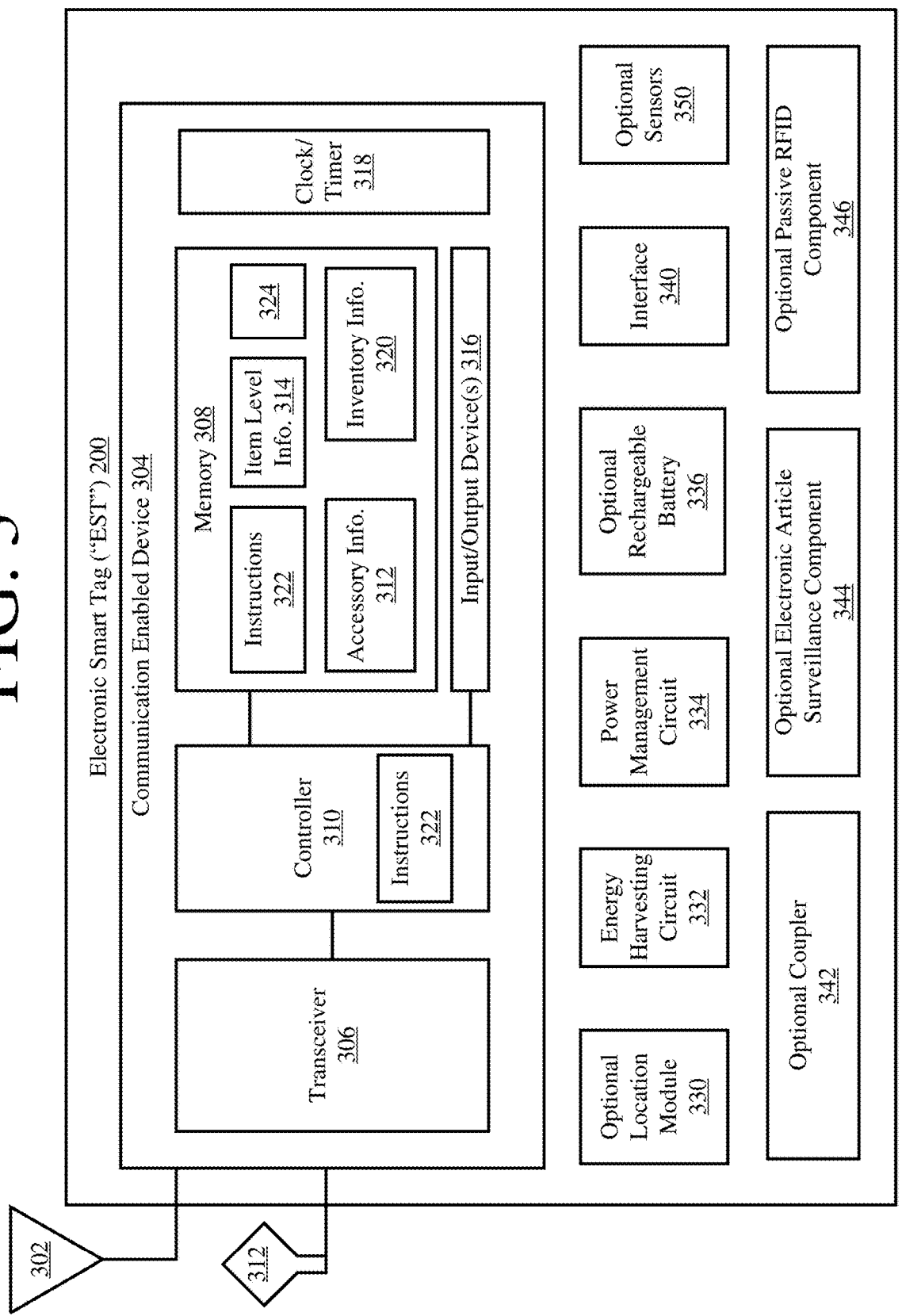
FIG. 3 is a block diagram of an illustrative architecture for the EST of FIG. 2.

The EST 200 can include more or less components than that shown in FIG. 3. However, the components shown are sufficient to disclose an illustrative embodiment implementing the present solution. Some or all of the components of the EST 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative EST 200 configured to facilitate improved inventory management, merchandise sales, and/or customer experience. In this regard, the EST 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is) are employed: Radio Frequency ("RF") communication technology; Bluetooth technology; WiFi technology; Sub-GHz technology; beacon technology; LiFi technology; and/or an Ultra Wide Band ("UWB") radio. Each of the listed wireless communication technologies is well known in the art, and therefore will not be described in detail herein. Any known or to be known wireless communication technology or other wireless communication technology can be used herein without limitation.

The components 306-318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed EST 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the EST 200 is coupled. The communication enabled device 304 also facilitates the automatic and dynamic modification of item level information, accessory information, and/or inventory product information that is being or is to be output from the EST 200 in response to certain trigger events. The trigger events can include, but are not limited to, the EST's arrival at a particular facility (e.g., facility 102 of FIG. 1), the EST's arrival in a particular country or geographic region, a date occurrence, a time occurrence, a price change, the reception of user instructions, the detection of an individual in proximity to an item (e.g., item 118 of FIG. 1) to which the EST is coupled, the detection of an individual's proximity to an item (e.g., item 118 of FIG. 1) to which the EST is coupled, and/or the detection of an individual's interaction with an item to which the EST is coupled.

Item level information 314, accessory information 312, inventory information 320, and/or other information 324 associated with the identification, location and/or motion/movement of the EST 200 can be stored in memory 308 of the communication enabled device 304 and/or communicated to other external devices (e.g., computing device 112 of FIG. 1 and/or mobile device 126 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol, location information, and/or sensor data to an external computing device. The external computing device (e.g., server) can then store the information in a datastore (e.g., datastore 114 of FIG. 1) and/or use the information during language and/or currency conversion operations and/or during tag display change operations.

The communication enabled device 304 also comprises a controller 310 and input/output devices 316. The controller 310 can also execute instructions 322 implementing methods for facilitating item inventorying, merchandise sales and/or customer satisfaction. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the EST 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the EST 200 and that cause the EST 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information, accessory information, and/or inventory information in a textual format and/or graphical format. Similarly, the speaker may be used to output item level information, accessory information, and/or inventory information in an auditory format. The speaker and/or light emitting diodes may be used to output alerts for drawing a person's attention to the EST 200 and/or for notifying the person of a particular pricing status (e.g., on sale status) of the item to which the EST is coupled.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The EST 200 also comprises an optional location module 330. The location module 330 is generally configured to determine the geographic location of the EST at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the EST 200 to an item (e.g., item 118 of FIG. 1). The coupler 342 includes, but is not limited to, a mechanical coupling means (e.g., a strap, clip, clamp, snap) and/or adhesive (e.g., glue or sticker). The coupler 342 is optional since the coupling can be achieved via a weld and/or chemical bond.

The EST 200 can also include an optional rechargeable battery 336, an optional Electronic Article Surveillance ("EAS") component 344, and/or an operational passive/active/semi-passive RFID component 346. Each of the listed optional components 336, 344, 346 is well known in the art, and therefore will not be described herein. Any known or to be known battery, EAS component and/or RFID component can be used herein without limitation.

As shown in FIG. 2, the EST 200 further comprises an energy harvesting circuit 332 and a power management circuit 334 for ensuring continuous operation of the EST 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the EST 200 is attached to merchandise). Second, the energy harvesting circuit 332 can harvest energy while offline (i.e., when the EST 200 is detached from merchandise) via a charging station/bin. This ensures that the EST 200 is fully charged when the EST is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The EST 200 may also include optional sensors 350 employing environmental and proximity sensing technology. The sensors 350 can include, but are not limited to, a light sensor, a fluid/liquid/humidity sensor, an IR detector, a camera, a proximity sensor, an IMU, an accelerometer, a gyroscope, an RF detection unit, at least one switch (e.g., electro-mechanical switch), and/or a heat sensor (e.g., UWB radio). The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the EST 200. In the event all of the storage and harvesting resources deplete to a point where the EST 200 is about to enter a shutdown/brownout state, the power management circuit 334 can cause an alert to be sent from the EST 200 to a remote device (e.g., computing device 112 of FIG. 1). In response to the alert, the remote device can inform an associate (e.g., a store employee) so that (s)he can investigate why the EST 200 is not recharging and/or holding charge.

The power management circuit 334 is also capable of redirecting an energy source to the EST's 200 electronics based on the energy source's status. For example, if harvested energy is sufficient to run the EST's 200 function, the power management circuit 334 confirms that all of the EST's 200 storage sources are fully charged such that the EST's 200 electronic components can be run directly from the harvested energy. This ensures that the EST 200 always has stored energy in case harvesting source(s) disappear or lesser energy is harvested for reasons such as drop in RF, light or vibration power levels. If a sudden drop in any of the energy sources is detected, the power management circuit 334 can cause an alert condition to be sent from the EST 200 to the remote device (e.g., computing device 112 of FIG. 1). At this point, an investigation may be required as to what caused this alarm. Accordingly, the remote device can inform the associate (e.g., a store employee) so that (s)he can investigate the issue. It may be that other merchandise are obscuring the harvesting source or the item is being stolen.

Figure 4:
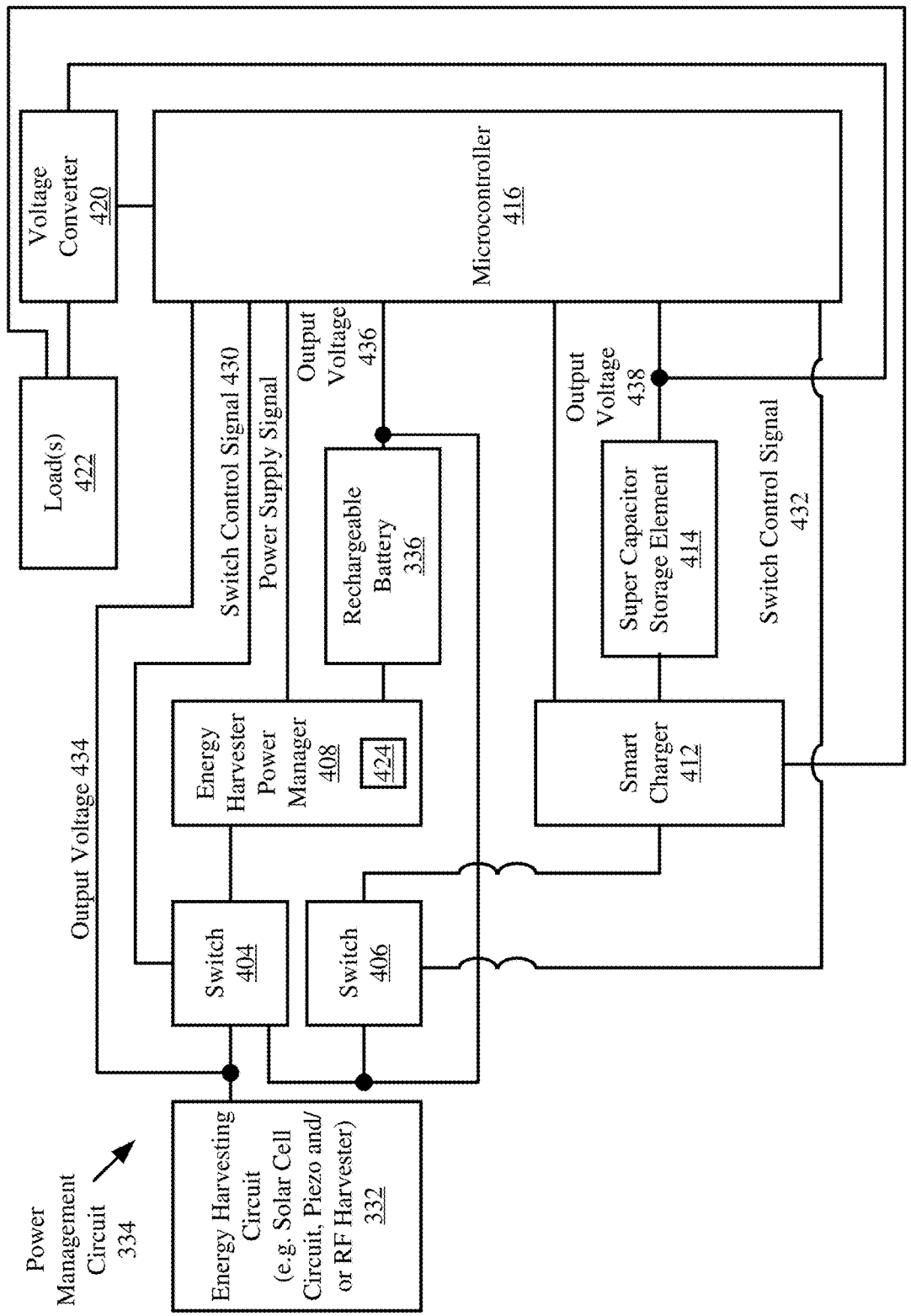
FIG. 4 is a block diagram of an illustrative architecture for a power management circuit of the EST of FIGS. 2-3.

Referring now to FIG. 4, there is provided a block diagram of an exemplary architecture 400 for the power management circuit 334 of the EST 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the EST 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional rechargeable battery 336. The power management circuit 334 comprises switches 404, 406, an Energy Harvester Power Manager ("EHPM") 408, a Super Capacitor ("SC") storage element 414, a smart charger 412 for the SC storage element, a microcontroller 416, and a DC-DC voltage converter 420 electrically connected to a load(s) 422. The microcontroller 416 can be the same as or separate/distinct from the controller 310 of FIG. 3. The load 422 can include, but is not limited to, components 304, 330, 340, 350, 344 and/or 346 of FIG. 3.

In some scenarios, the energy harvesting circuit 332 comprises a solar cell circuit. The present solution is not limited in this regard. Other types of energy harvesting circuits can be used herein that generate a relatively low amount of output power.

At initial power up of the EST 200, the SC storage element 414 is assumed to be in a completely discharged state. Thus, the initial charge of the SC storage element 414 is at a level of approximately or substantially equal to zero volts. However, the rechargeable battery 336 is in a quasi-discharged state in which its initial charge is at a level greater than zero volts (e.g., 3 volts). As such, the rechargeable battery 336 has a sufficient amount of initial stored energy to nearly instantaneously enable operations of the control electronics of the EST 200. In this regard, an output voltage 436 is supplied from the rechargeable battery 336 to the EHPM 408 via switch 404, whereby operations of boost converters 424 contained in the EHPM 408 are started immediately after turning on the EST 200. The output voltage 436 is also supplied from the rechargeable battery 336 to the microcontroller 416 via the EHPM 408.

The available power from rechargeable battery is also used at this time to charge the SC storage element 414. In this regard, the output voltage 436 of the rechargeable battery 336 is supplied to the SC storage element 414 via switch 406 and smart charger 412, whereby charging of the SC storage element is expedited. An output voltage 438 of the SC storage element is supplied to the load(s) 422 via the voltage converter 420. The EST 200 is considered fully operational when the output voltage 438 reaches a level (e.g., 3.8 V) that is sufficient to cause the load(s) to perform the intended operations thereof.

Throughout operation of the EST 200, the microcontroller 416 monitors the output voltage 434 of the solar cell circuit 402, as well as the output voltage 436 of the rechargeable battery and the output voltage 438 of the SC storage element 414. Once the output voltage 438 of the SC storage element 414 reaches a desired voltage (e.g., 3.8 V) after system activation (or powering on), the microcontroller 416 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 416 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 416 communicates a switch control signal 432 to switch 406 so as cause the output voltage 436 of the rechargeable battery 410 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the rechargeable battery 336 via EHPM 408. In effect, the rechargeable battery 336 is recharged by the solar cell circuit 402, whereby the energy expended in charging and re-charging the SC storage element 414 is restored while the EST 200 is maintained in its fully operational state.

The above described process of using the rechargeable battery 336 to charge the SC storage element 414 is repeated as needed. Thus, the above described EST 200 performs self-monitoring and charges its respective re-chargeable elements throughout its entire operation.

Figure 5:
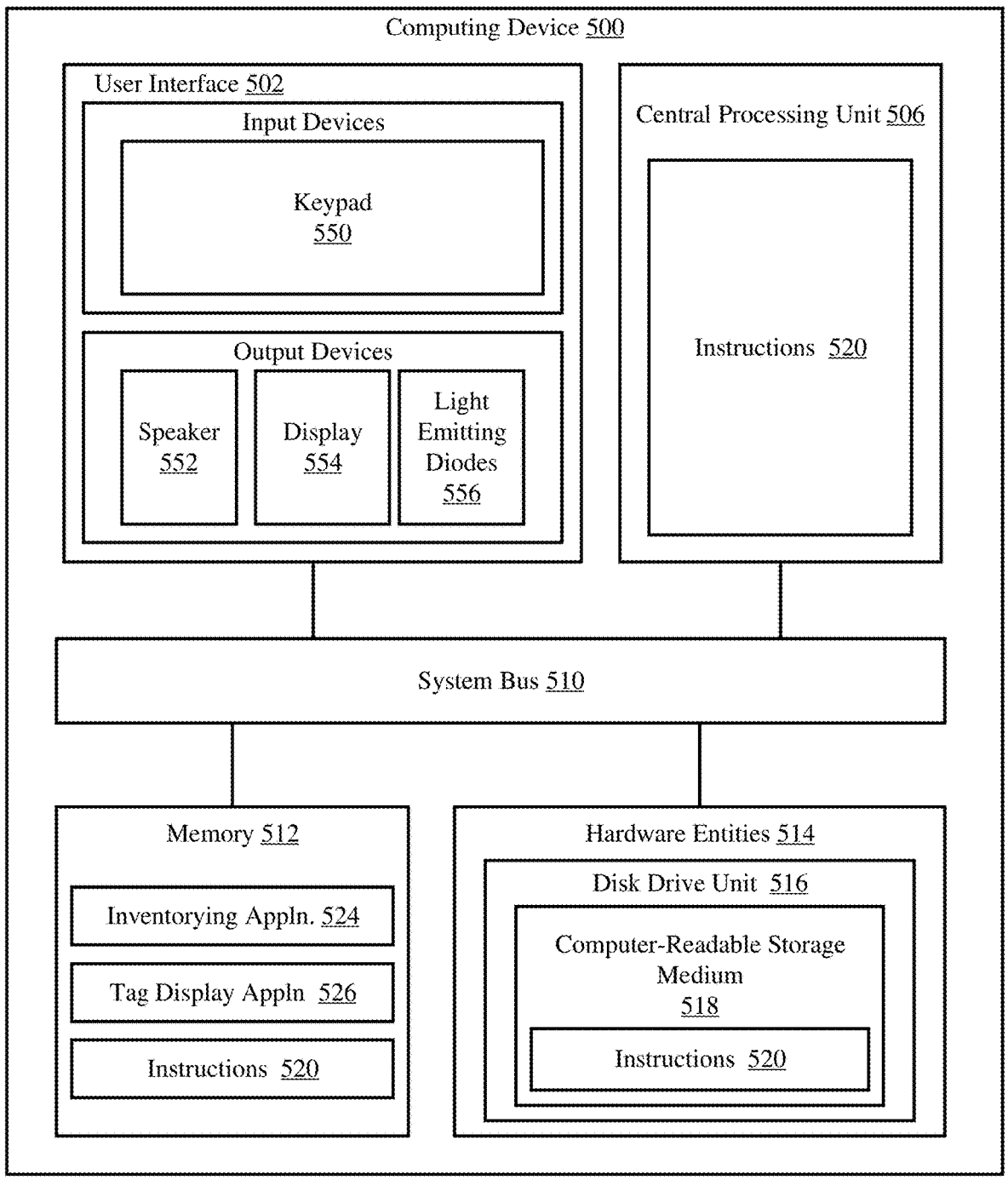
FIG. 5 is a block diagram of an illustrative architecture for a computing device.

Referring now to FIG. 5, there is provided a detailed block diagram of an exemplary architecture for a computing device 500. Computing device 112 of FIG. 1 is the same as or substantially similar to computing device 500. As such, the following discussion of computing device 500 is sufficient for understanding computing device 112.

Computing device 500 may include more or less components than those shown in FIG. 5. However, the components shown are sufficient to disclose an illustrative embodiment implementing the present solution. The hardware architecture of FIG. 5 represents one embodiment of a representative Computing device configured to facilitate improved inventory pricing management. As such, the computing device 500 of FIG. 5 implements at least a portion of a method for automatically and dynamically modifying item level information, accessory information, and/or inventory information output from smart tags and/or ESLs in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 320 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 320 for execution by the computing device 500 and that cause the computing device 500 to perform any one or more of the methodologies of the present disclosure.

In some scenarios, the hardware entities 514 include an electronic circuit (e.g., a processor) programmed for facilitating item inventorying, merchandise sales, and/or customer satisfaction with a shopping experience. In this regard, it should be understood that the electronic circuit can access and run an inventorying application 524 and a tag display application 526 installed on the computing device 500. The software applications 524-526 are collectively generally operative to: obtain item level information and/or other information from smart tags and/or ESLs; program item level information, accessory information and/or inventory information onto smart tags and/or ESLs; convert the language, pricing and/or currency symbol of item level information, accessory information and/or inventory information; facilitate registration of smart tags and/or ESLs with enterprise systems; and/or determine when tag display update actions need to be taken based on various information such as smart tag information. Other functions of the software applications 524-526 will become apparent as the discussion progresses.

Figure 6A:
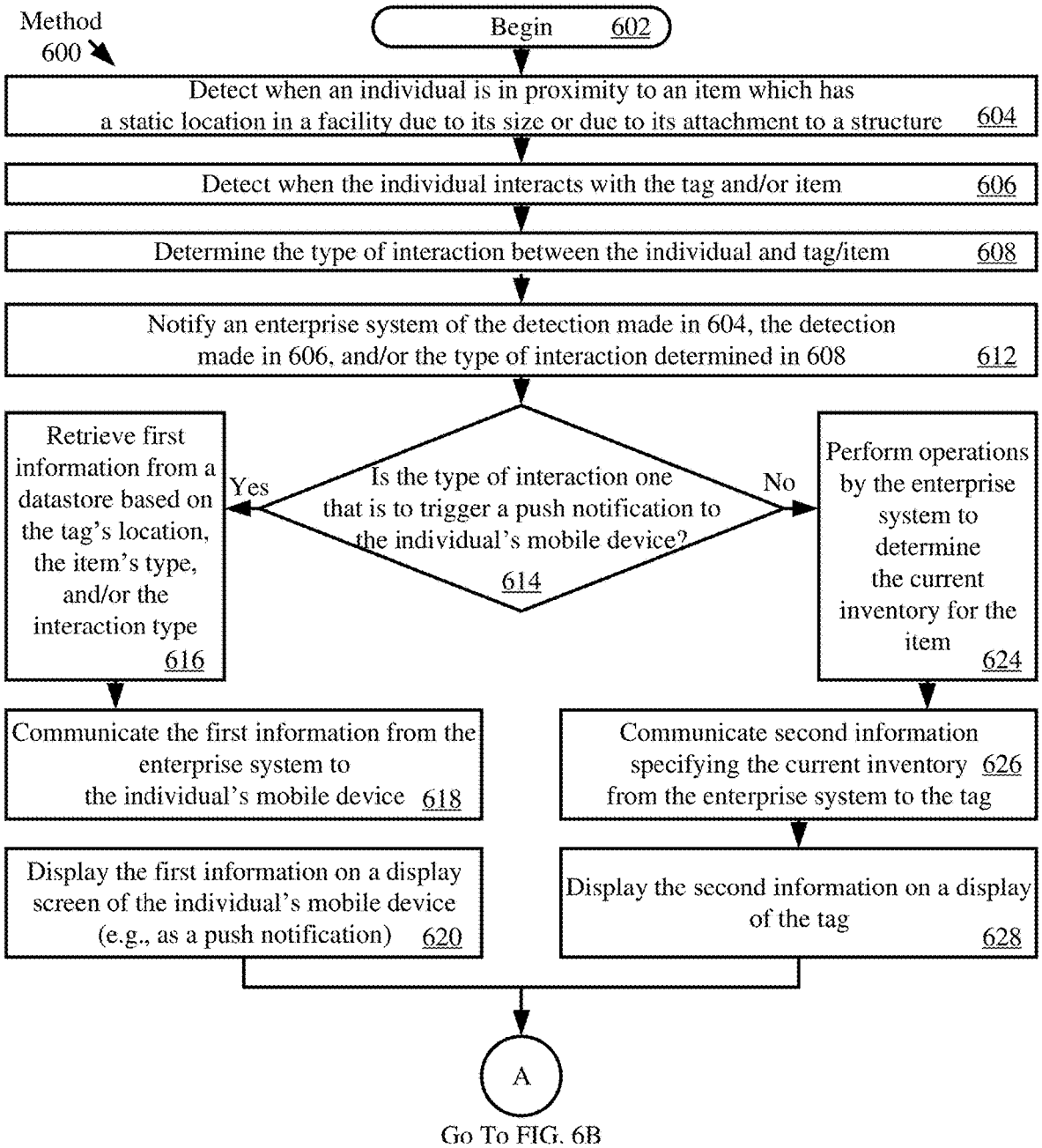
FIGS. 6A-6B (collectively referred to herein as "FIG. 6") provide a flow diagram of an illustrative method for dynamically changing displayed content of a tag.

Referring now to FIG. 6, there is provided a flow diagram of an illustrative method 600 for dynamically changing displayed content of a tag (e.g., smart tag 120 of FIG. 1 or 200 of FIGS. 2-3). Method 600 can be repeated each time an individual interacts with the tag or item to which the tag is coupled. Thus, the tag's displayed content can be dynamically changed multiple times when the individual is interacting with the tag or item (e.g., when the individual is looking inside a home appliance (e.g., an oven with a smart home control system as an accessory) and/or when the individual is scrolling through an electronic menu, etc.).

Method 600 comprises operations performed in blocks 602-654. The present solution is not limited to the particular order in which the operations of blocks 602-654 are performed in FIG. 6. The location of one or more of the blocks of FIG. 6 can be changed. For example, block 608 can alternatively reside after 612 when the type of interaction is to be determined by the enterprise system rather than by the tag. Alternatively, block 608 can be repeated after 612 when the type of interaction determined by the tag is to be checked by the enterprise system. The present solution is not limited to the particulars of this example.

As shown in FIG. 6, method 600 begins with 602 and continues with 604-606 where detections are made by the tag (e.g., smart tag 120 of FIG. 1 or 200 of FIGS. 2-3). More particularly, sensor data is generated by one or more sensors (e.g., sensors 350 of FIG. 3) local to the tag. The sensor data is then analyzed to: detect when an individual is in proximity to an item (e.g., item 118 of FIG. 1) which has a static location in a facility due to its size or due to its attachment to a structure (e.g., via security cable or tether); and detect when the individual interacts with the tag and/or item. In some scenarios, the tag also determines the type of interaction between the individual and the tag and/or item, as shown by 608.

Next in 612, the tag notifies an enterprise system (e.g., computing device 112 of FIG. 1) of the detection made in 604, the detection made in 606, the type of interaction determined in 608, and/or its current location determined in 610. Illustrative types of interaction include, but are not limited to, (1) trying on a wearable item (e.g., a watch), (2) scrolling through an electronic menu or software applications, (3) touching a surface of the item, (4) opening all or a portion of an item (e.g., opening an oven door), (5) taking something out of an item, (6) putting something in an item, (7) removing something from an outer surface of the item (e.g., lifting up a stove top cover), and/or (8) measuring a size of the item. Interactions of type (8) can be determined based on results of an image or video analysis, and/or an analysis of heat signature movement around the item.

In some scenarios, the type of interaction can be determined based on sensor data generated by sensors internal to the tag, sensors internal to another tag coupled to the item, sensors coupled directly to the item at various locations, and/or sensors located in proximity to the item (e.g., a camera mounted on a near-by wall or ceiling). Accordingly, the tag and/or enterprise system comprises a communication component operative to communicate with other tags and/or external sensors.

At the enterprise system or the tag, a decision is made as to whether the type of interaction is one that is to trigger a push notification to the individual's mobile device (e.g., mobile device 126 of FIG. 1). This decision can be made using a look-up table or list specifying the type of interactions which are triggers for push notifications. The look-up table or list can be stored in a local memory of the tag (e.g., memory 308 of FIG. 3), a local memory of computing device (e.g., memory 512 of FIG. 1), and/or in a datastore (e.g., datastore 114 of FIG. 1). A push notification is a message that pops up on a mobile device.

If the type of interaction is a trigger for push notifications [614:YES], method 600 continues with 616 where first information is retrieved from a datastore based on the item's type and/or the interaction type. The datastore includes, but is not limited to, a memory local to the tag (e.g., memory 308 of FIG. 3), a memory local to a computing device (e.g., memory 512 of FIG. 1), or database (e.g., datastore 114 of FIG. 1). Techniques for performing datastore look-ups based on various criteria are well known in the art, and therefore will not be described herein. Any known or to be known method for performing datastore look-ups based on various criteria can be used herein without limitation. The first information includes, but is not limited to, promotional materials, sale notifications, and/or account status information. The first information is then communicated from the enterprise system or tag to the individual's mobile device, as shown by 618. In the tag scenario, a short range communication and/or LiFi communications can be used to communicate the first information from the tag to the mobile device. In 620, the first information is displayed on a display screen of the individual's mobile phone (e.g., as a push notification). Subsequently, method 600 continues with 630 of FIG. 6B, which will be discussed below.

In contrast, if the type of interaction is not a trigger for push notifications [614:NO], then method 600 continues with 624 where the enterprise system performs operations to determine the current inventory for the item. The current inventory can be determined based on historical inventory data collected during an inventory process and stored in a datastore (e.g., datastore 114 of FIG. 1). Inventory processes are well known in the art, and therefore will not be described herein. Any known or to be known inventory process can be used herein without limitation.

In next 626, the enterprise system communicates second information specifying the current inventory to the tag. The second information is then displayed on a display (e.g., display 316 of FIG. 3) of the tag. Other information may also be displayed along with the second information based on the value of the item's current inventory. For example, if there are zero items left in stock or only the displayed item is left in stock, then instructions for ordering the item are also displayed by the tag. The present solution is not limited to the particulars of this example. Subsequently, method 600 continues with 630 of FIG. 6B.

Figure 6B:
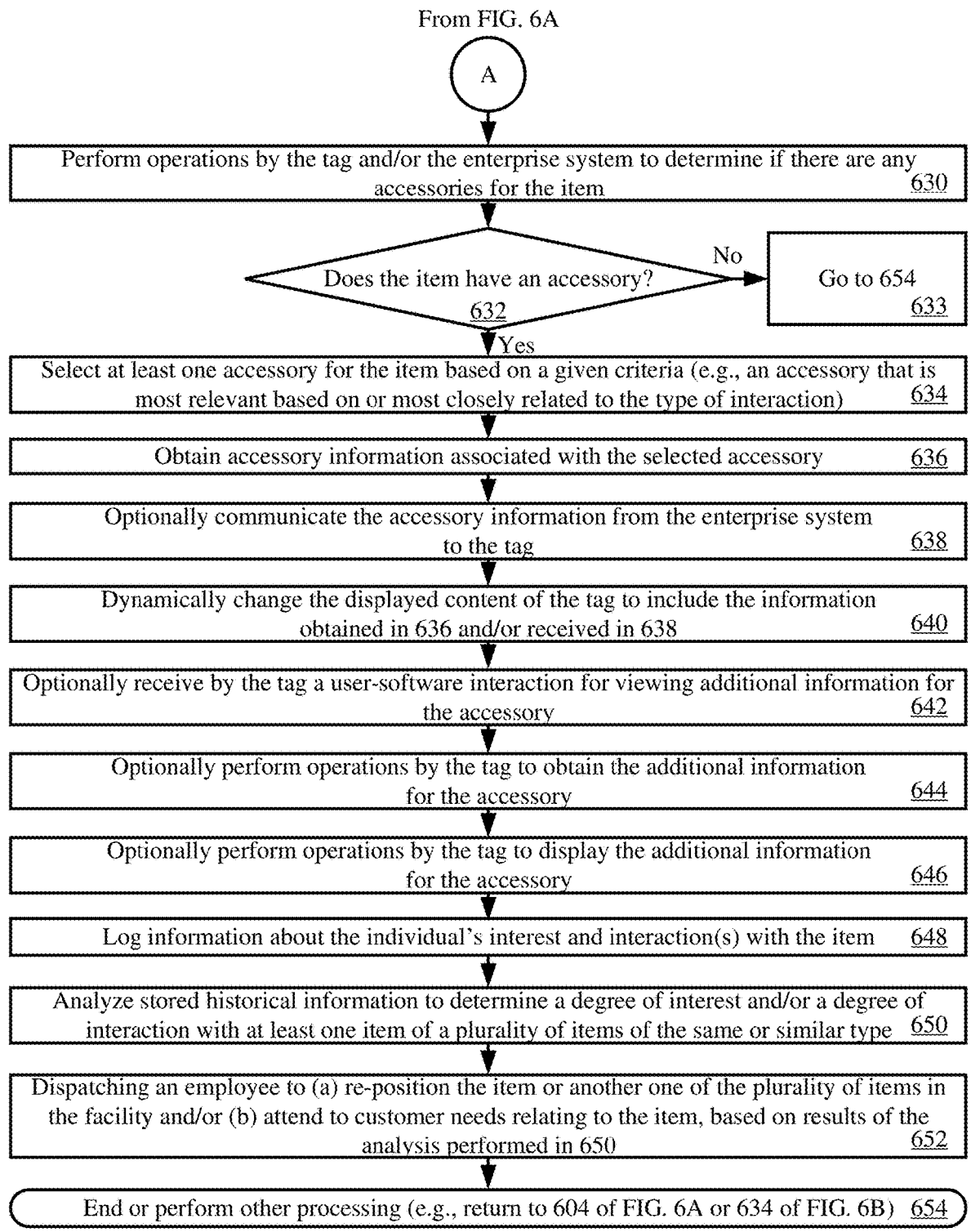

As shown in FIG. 6B, 630 involves performing operations by the tag and/or enterprise system to determine if there are any accessories for the item. An item/accessory relationship table (e.g., table 130 of FIG. 1) can be used in 630. The item/accessory relationship table can be stored in the tag's local memory and/or in a remote datastore (e.g., datastore 114 of FIG. 1). In some scenarios, the item/accessory relationship table comprises entries respectively associating item unique identifiers with accessory unique identifiers. If at least one accessory unique identifier is associated with the item's unique identifier in the item/accessory relationship table, then a determination is made that the item has an accessory. In contrast, if there are no accessory unique identifiers associated with the item's unique identifier in the item/accessory relationship table, then a determination is made that the item does not have an accessory.

If the item does not have any accessories [632:NO], then method 600 continues with 654, as shown by block 633. In 654, method 600 ends or other processing is performed (e.g., return to 604 if FIG. 6A or 634 of FIG. 6B).

If the item does have one or more accessories [632:YES], then method 600 continues with 634 where at least one accessory is selected for the item based on a given criteria. For example, an accessory (e.g., a baking dish or water pipe fittings) is selected from a plurality of accessories (e.g., pots, pans, stove burner covers, replacement drip pans, home automation systems, and various other products or attachments that could be used with an oven or washer/dryer) since it is most relevant based on or most closely related to the type of interaction (e.g., opening the oven door or touching a water pipe fitting on the back of the washer/dryer) and/or is located closest to the item. The tag's location, the item's location, the interaction type, the item/accessory relationship table (e.g., item/accessory relationship table 130 of FIG. 1), and/or accessory information (e.g., accessory information 132 of FIG. 1) are used in this scenario to make the selection. The present solution is not limited in to the particulars of this example. In some scenarios, a look-up table or hierarchical tree can be used here to identify which accessory is most relevant or closely related to the type of interaction.

Accessory information (e.g., accessory information 132 of FIG. 1) associated with the selected accessory is obtained in 636. 636 can involve obtaining accessory information for the selected accessory from a memory local to the tag (e.g., memory 308 of FIG. 3) and/or a remote datastore (e.g., datastore 114 of FIG. 1). Accordingly, the accessory information can be communicated from the enterprise system to the tag in some scenarios, as shown by optional 638. Next in 640, the displayed content of the tag is dynamically changed to include the accessory information.

Thereafter, the tag optionally receives a user-software interaction for viewing additional information for the accessory, as shown by 642. In response to the user-software interaction, the tag can obtain and display the additional information for the accessory, as shown by 644-646. The additional information can be obtained from a memory local to the tag (e.g., memory 308 of FIG. 3) and/or a remote datastore (e.g., datastore 114 of FIG. 1).

In 648, information is logged about the individual's interest and interaction(s) with the item. This information then becomes part of historical information stored in a datastore (e.g., datastore 114 of FIG. 1). The stored historical information is analyzed in 650 to determine a degree of interest and/or a degree of interaction with at least one item of a plurality of items of the same or similar type. Based on results of this analysis, an employee is dispatched in 652. The employee is displaced to: (a) re-position the item or another one of the plurality of items in the facility; and/or (b) attend to customer needs relating to the item with the highest degree of interest and/or interaction. Subsequently, 654 is performed where method 600 ends or other processing is performed (e.g., return to 604 of FIG. 6A or 634 of FIG. 6B).

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for dynamically changing displayed content of a tag attached to a first retail item, comprising:
    performing operations by at least one sensor of the tag to detect when an individual has a first interaction with the first retail item while the individual is located in proximity to the first retail item;
    determining, by the tag, an interaction type for the first interaction, while the individual is still located in proximity to the first retail item;
    selecting at least one first accessory from a plurality of accessories for the first retail item based on the interaction type;
    obtaining information for the selected at least one first accessory that is to be presented to the individual;
    dynamically changing the displayed content of the tag to include the information obtained for the selected at least one first accessory, while the individual is still in proximity to the tag; and
    dynamically changing the displayed content of the tag to include information about at least one second accessory selected from the plurality of accessories based on a second interaction that the individual has with the first retail item while the individual is located in proximity to the first retail item, where the second accessory is different than the first accessory and the second interaction is different than the first interaction.

2. The method according to claim 1, wherein the at least one first accessory is selected based further on the first retail item's location and the at least one first accessories location.

3. The method according to claim 1, further comprising triggering a display of a push notification message on a mobile device of the individual in addition to a dynamic change of the displayed content of the tag, when the interaction type is a certain one of a plurality of interaction types.

4. The method according to claim 1, further comprising determining a current inventory for the first retail item in response to a detection that the individual is interacting with the first retail item.

5. The method according to claim 4, wherein the displayed content of the tag is dynamically changed to further include the current inventory.

6. The method according to claim 5, wherein the displayed content of the tag is dynamically changed to further include instructions how to order the first retail item, when the current inventory not on display is zero.

7. The method according to claim 1, further comprising logging information about an interest of the individual and interaction with the first retail item as part of historical information.

8. The method according to claim 1, further comprising analyzing historical data to determine a degree of interest or a degree of interaction for each second retail item of a plurality of second retail items by a plurality of individuals, where said second retail items (a) comprise retail items other than the first retail item, (b) comprise retail items other than the at least one first accessory, and (c) are retail items of a same or similar type as the first retail item.

9. The method according to claim 8, further comprising dispatching a person to re-position at least one of the first retail item and the second retail item.

10. The method according to claim 8, further comprising dispatching a person to attend to an individual's needs relating to the second retail item.

11. The method according to claim 1, wherein the first interaction comprises (1) trying on the first retail item which is wearable (2) scrolling through an electronic menu or software applications of the first retail item, (3) touching a surface of the first retail item, (4) opening all or a portion of the first retail item, (5) taking something out of the first retail item, (6) putting something in the first retail item, (7) removing something from an outer surface of the first retail item, or (8) measuring a size of the first retail item.

12. The method according to claim 1, further comprising:
determining a number of customer interactions and types of customer interactions with the first retail item; and
determine a number of employees needed to attend to customer needs based on the number of customer interactions and the types of customer interactions.

13. The method according to claim 1, further comprising analyzing historical data to determine a degree of interest or a degree of interaction for each second retail item of a plurality of second retail items by a plurality of individuals, where said second retail items (a) comprise retail items other than the first retail item, (b) comprise retail items other than the at least one first accessory, and (c) are retail items of a same or similar type as the first retail item, wherein the at least one first accessory is selected based further on the first retail item's location and the at least one first accessories location.

14. The method according to claim 13, further comprising determining a current inventory for the first retail item in response to a detection that the individual is interacting with the first retail item, wherein the displayed content of the tag is dynamically changed to further include the current inventory.

15. A system, comprising:
a first tag that is attached to a first retail item, and that comprises at least one sensor to detect when an individual has a first interaction with the first retail item while the individual is located in proximity to the first retail item;
a processor comprising at least the first tag; and
a non-transitory computer-readable storage medium comprising programming instructions that are configured to cause the processor to implement a method for dynamically changing displayed content of the first tag, wherein the programming instructions comprise instructions to:
determine an interaction type for the first interaction which was detected by the at least one sensor, while the individual is still located in proximity to the first retail item;
select at least one first accessory from a plurality of accessories for the first retail item based on the interaction type;
obtain information for the selected at least one first accessory that is to be presented to the individual;
cause the displayed content of the first tag to be dynamically changed to include the information obtained for the selected at least one first accessory, while the individual is still in proximity to the first tag; and
cause the displayed content of the first tag to be dynamically changed to include information about at least one second accessory selected from the plurality of accessories based on a second interaction that the individual has with the first retail item while the individual is located in proximity to the first retail item, where the second accessory is different than the first accessory and the second interaction is different than the first interaction.

16. The system according to claim 15, wherein the at least one first accessory is selected based further on the first retail item's location and the at least one first accessories location.

17. The system according to claim 15, wherein the programming instructions comprise instructions to trigger a display of a push notification message on a mobile device of the individual in addition to a dynamic change of the displayed content of the first tag, when the interaction type is a certain one of a plurality of interaction types.

18. The system according to claim 15, the programming instructions comprise instructions to determine a current inventory for the first retail item in response to a detection that the individual is interacting with the first retail item.

19. The system according to claim 18, wherein the displayed content of the first tag is dynamically changed to further include the current inventory.

20. The system according to claim 19, wherein the displayed content of the first tag is dynamically changed to further include instructions how to order the item, when the current inventory not on display is zero.

21. The system according to claim 15, the programming instructions comprise instructions to log information about an interest of the individual and interaction with the first retail item as part of historical information.

22. The system according to claim 17, the programming instructions comprise instructions to analyze historical data to determine a degree of interest or a degree of interaction for each second retail item of a plurality of second retail items by a plurality of individuals, where said second retail items (a) comprise retail items other than the first retail item, (b) comprise retail items other than the at least one first accessory, and (d) are retail items of a same or similar type as the first retail item.

23. The system according to claim 22, the programming instructions comprise instructions to cause a person to re-position at least one of the first retail item and the second retail item.

24. The system according to claim 22, the programming instructions comprise instructions to cause a person to attend to an individual's needs relating to the second retail item.

25. The system according to claim 15, the programming instructions comprise instructions to analyze historical data to determine a degree of interest or a degree of interaction for each second retail item of a plurality of second retail items by a plurality of individuals, where said second retail items (a) comprise retail items other than the first retail item, (b) comprise retail items other than the at least one first accessory, and (d) are retail items of a same or similar type as the first retail item, wherein the at least one first accessory is selected based further on the first retail item's location and the at least one first accessories location.

26. The system according to claim 25, the programming instructions comprise instructions to determine a current inventory for the first retail item in response to a detection that the individual is interacting with the first retail item, wherein the displayed content of the first tag is dynamically changed to further include the current inventory.

* * * * *